United States Patent [19]

Moser

[11] Patent Number: 4,587,850

[45] Date of Patent: May 13, 1986

[54] ARRANGEMENT FOR DETERMINING THE TRAVEL OF A PISTON

[75] Inventor: Bernd Moser, Wissen, Fed. Rep. of Germany

[73] Assignee: Boge GmbH, Eitorf, Fed. Rep. of Germany

[21] Appl. No.: 653,930

[22] Filed: Sep. 24, 1984

Related U.S. Application Data

[63] Continuation-in-part of Ser. No. 621,075, Jun. 15, 1984.

[30] Foreign Application Priority Data

Sep. 24, 1983 [DE] Fed. Rep. of Germany ....... 3334636
Oct. 22, 1983 [DE] Fed. Rep. of Germany ....... 3338443

[51] Int. Cl.$^4$ .................................... G01R 27/26
[52] U.S. Cl. ..................... 73/658; 324/61 R; 324/59; 324/71.1; 324/207
[58] Field of Search ............ 73/658, 11, 118; 324/61 R, 59, 71.1, 207

[56] References Cited

U.S. PATENT DOCUMENTS

| | | | |
|---|---|---|---|
| 2,978,638 | 4/1961 | Wing et al. ................ | 324/70 |
| 3,805,150 | 4/1974 | Abbe ......................... | 324/61 |
| 3,833,094 | 9/1974 | Grossman ................. | 73/11 |
| 4,107,975 | 8/1978 | Cargile ..................... | 73/11 |
| 4,206,401 | 6/1980 | Meyer ....................... | 324/61 |

FOREIGN PATENT DOCUMENTS

| | | |
|---|---|---|
| 1248959 | 8/1967 | Fed. Rep. of Germany . |
| 1299432 | 7/1969 | Fed. Rep. of Germany . |
| 1933640 | 1/1970 | Fed. Rep. of Germany . |
| 3212433 | 4/1983 | Fed. Rep. of Germany . |
| 3244891 | 6/1984 | Fed. Rep. of Germany . |
| 136069 | 6/1979 | German Democratic Rep. . |
| 2106651 | 4/1983 | United Kingdom . |

*Primary Examiner*—Anthony V. Ciarlante
*Attorney, Agent, or Firm*—Nils H. Ljungman

[57] ABSTRACT

An arrangement for determining and measuring the position or travel of a piston in a cylinder, e.g., suspension component such as a vibration damper, gas-spring or hydropneumatic suspension, uses a structure having no moving electrical contacts, nor any movable electrical leads. The arrangement measures a variable impedance, e.g., a capacitance which is created by first and second electrodes formed within the suspension component and is distinguished in that the electrodes are fixed and are immovable with respect to each other. Capacitance variation is achieved, for example, by allowing a dielectric medium, such as a ceramic or epoxy resin cylinder to enter between two electrodes, the extent of the entry of the dielectric medium being made to be proportional to the relative travel of the piston in the cylinder. In a variation, an additional electrode forming a fixed reference capacitance with the first electrode is provided. The fixed reference capacitance is used together with the measured variable capacitance in a measuring bridge, e.g., Wheatstone bridge, so that undesirable effects of varying temperature and pressure on the capacitances inside the suspension component are compensated during measurement. By virtue of the fact that all the electrodes are fixed relative to one another, the conductive leads from the fixed electrodes can be made immovable relative to each other, whereby measurement problems owing to improper leads and connections are eliminated.

21 Claims, 13 Drawing Figures

ARRANGEMENT FOR DETERMINING THE TRAVEL OF A PISTON

RELATED PATENT APPLICATION

This is a continuation-in-part application of U.S. Ser. No. 621,075, filed on June 15, 1984.

BACKGROUND OF THE INVENTION

1. Field of the Invention

The invention relates generally to a contactless arrangement for determining the travel of a piston of hydraulic, pneumatic or hydropneumatic assemblies such as vibration dampers, gas springs and hydropneumatic suspension, wherein the piston along with a piston rod, slides axially in a cylinder filled with at least one damping medium, and wherein an impedance, e.g., capacitive reactance, is formed in the interior by tubular electrodes.

2. Description of the Prior Art

In arrangements of this kind for the contactless measurement of the travel of a piston, it has been found that because of different relatively moving electrode components, precise evaluation of the electric signals produced by the electrodes becomes impractical owing to disturbing influences arising through unfavorable lengths of lead.

OBJECT OF THE INVENTION

It is, therefore, the aim of this invention to substantially eliminate movable connecting leads so that disturbing influences arising from external variations of the measured value are avoided as far as possible so that a reliable evaluation of the variable capacitance is achieved

SUMMARY OF THE INVENTION

To solve this problem, according to one embodiment of the invention, there is provided in a vibration damper a first electrode insulated with respect to a supporting component that receives it, and a second electrode arranged non-displaceably within the interior of the first electrode and spaced from it; a dielectric member having a known dielectric constant is disposed so as to be able to enter between the first and second electrodes, during the functioning of the vibration damper.

In such an arrangement, it is significant that no unfavorable lengths of lead are present. The electric connections for the two electrodes are taken out of the supporting components that receive them and accordingly are close to one another. By the avoidance of unnecessary lengths of lead, any disturbing influences from outside are largely eliminated, so that a reliable evaluation of the measured values can be achieved. Further it is of advantage that the mounting of a measuring arrangement can be selected according to the type of vehicle so that measuring means are mounted either on the piston rod or on the cylinder, and this allows one to avoid mounting on the unsprung mass of the vehicle and allows mounting on the bodywork to be achieved without difficulty.

According to an important feature of the invention, the first and second electrodes are arranged advantageously in the interior of the piston rod, and the dielectric medium used is secured in the cylinder.

Expediently, in such an arrangement, a contactlessly operating method of making the physical measurement can be received in the interior of the piston rod as a compact assembly so that simple integration is possible. Since all the components employed are tubular, they are matched without any problems, to the geometry of the piston rod. Such a system can be employed without major modifications, for example, in the piston rod of a vibration damper, a gas spring or a hydropneumatic suspension.

In another preferred embodiment of the invention, the first and second electrodes are mounted in the cylinder whereas the dielectric is provided inside the piston rod.

Preferably, the dielectric comprises a ceramic tube; by the use of such a tube because of the characteristics of the ceramic material, the pressure and temperature influence in the measuring system will be minimal.

In an improvement of the foregoing embodiment, the cylindrical inner surface of the ceramic tube is advantageously connected electrically to the cylindrical outer surface of the second electrode, which means that an electrically conducting tube is incorporated into the ceramic tube and connected to the inner electrode by for example an electrically conducting spring. By such a conducting inner layer, the oil gap which would otherwise be made necessary by the tolerances can be eliminated. This oil gap acts in principle as a further dielectric because of the tolerances and the consequently varying spacing, whereby variations arise in the measured values; such undesirable variations can be eliminated by the electrically conducting connection. In order to further facilitate formation of the electrically conducting connection, the cylindrical inner surface of the ceramic tube may be provided with a metallic layer. In order to additionally amplify effectiveness of the electric conducting layer, preferably, an electrically conducting ring is mounted on the cylindrical outer surface of the second electrode, this ring having an outside diameter corresponding to the inside diameter of the dielectric.

To evaluate the variable capacitance with simultaneous compensation for pressure and temperature, it is proposed according to a further embodiment that all the electrodes should be fixed relative to one another and should be insulated from the supporting component that receives them, the first and second electrodes being separated from each other by a dielectric. Also, a third electrode is spaced from the second electrode in such a way that a tubular body can enter the space between them. In such an arrangement, it is of significance that no unfavorable lengths of conducting lead are present. The electric connections for the individual electrodes are taken directly out of the component and accordingly lie close to one another. By eliminating unnecessary lengths of lead, disturbing influences from outside are largely eliminated, so that a reliable evaluation of the measured signals can be achieved. Furthermore, it is an advantage that the mounting of the measuring system can be chosen in accordance with the type of vehicle so that the apparatus is mounted either on the piston rod or on the cylinder, which allows one to avoid mounting the arrangement on the unsprung mass of the vehicle and allows it to be mounted on the bodywork.

According to a further important feature of the invention, all the electrodes are mounted in the interior of the piston rod, an insulating body being provided between the outer surface of the first electrode and the cylindrical inner surface of the piston rod, the tubular body being connected rigidly to the cylinder.

In this embodiment, it is advantageous that the contactless arrangement of making the physical measurement can be received in the interior of the piston rod as a compact assembly unit so that simple integration is possible with the components which are all of tubular shape.

It is furthermore advantageous that all the connections and the actual capacitor are received within the piston rod. This allows the possibility of mounting the evaluating electronic circuits without upsetting acceleration influences, since the piston rod is usually mounted on the bodywork, so that during operation of the vehicle no noticeable acceleration acts on the piston rod.

In order to take advantage of the geometry of the hollow piston rod and simultaneously realize all cost-favorable and manufacturing advantages, a tube of synthetic resin, such as an epoxy resin, is used as the insulating body in another embodiment.

In a further important modification, an earthed electrically conducting tube is provided as the tubular body. This tubular body is secured in the base of the cylinder and, on inward movement of the piston rod, it enters between the second and third electrodes. The first and second electrodes form a fixed capacitance which is introduced for compensation of varying temperature and pressure influences on the measurement.

The second and third electrodes, between which the tube enters, produce a resultant variable capacitance for determining the travel of the piston. In this connection it is advantageous that the penetration of the earthed tube between the second and third electrodes reduces the capacitance since the effective capacitive surface area is reduced.

In an important modification, it is envisaged that the tubular body comprises an electrically non-conducting tube. In this way, full use is made of the fact that the non-conducting tube acts as a dielectric and accordingly on entry between the second and third electrodes, a parallel circuit of two capacitances is obtained. This parallel circuit is a consequence of the two different dielectrics, since the insulating tube and the medium (e.g. mineral oil, such as commercially available shock absorber oil) present in the remaining part have different dielectric constants. During the measurement of the variable capacitance, this characteristic is represented by a parallel connection of two capacitances, the overall capacitance being derived by addition of the two individual capacitances.

A particularly preferred material for the tubular body comprises synthetic resin.

In an alternative, magnetic or inductive embodiment of the invention to measure the piston displacement, the outer surface of the cylinder is provided with, over at least a portion of the region of the piston travel, at least one winding producing a magnetic field. The piston and piston rod of the vibration damper, being disposed in this magnetic field, produce an increase in the inductance as the piston and piston rod move further into the damper cylinder; by measuring and converting the inductance into an electrical signal, the determination of the piston position and thus travel can likewise be obtained. This embodiment is quite suitable for the output signal to be used as a basis, for example, vehicle height control.

In a modification of the inductive embodiment of the invention, two interacting inductive windings having longitudinal axes which are substantially coextensive with the longitudinal axis of the cylinder of the vibration damper are provided. Each of the windings covers preferably the distance of half the piston travel.

In these versions, advantageously, the piston rod can be made solid and not hollow. Ferromagnetic materials with relatively high permeance are advantageously used for making at least portions of the piston and/or the piston rod.

By such an arrangement of the windings, two inductances are formed which can be used directly as the series components of one side of an inductance measuring bridge.

BRIEF DESCRIPTION OF THE DRAWINGS

Preferred embodiments of the invention by way of example are illustrated diagrammatically in the accompanying drawings wherein.

DESCRIPTION OF THE PREFERRED EMBODIMENTS

Figure 1:
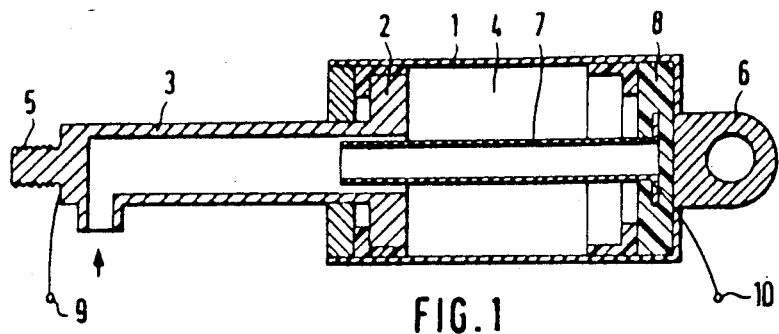
FIG. 1 shows a sectional view of a vibration damper, in which the hollow piston rod forms a variable capacitor in conjunction with a tube in a cavity of the damper.

The vibration damper illustrated in FIG. 1 comprises substantially a cylinder 1, a piston 2 and a piston rod 3, well known in the prior art. In the interior cavity 4 of the cylinder 1 there is at least one damping medium serving for damping vibrations of the piston 2. Attachment means 5 and 6, well-known in the prior art, are provided for mounting the vibration damper in a vehicle. The piston rod 3, which is made hollow, slides telescopically over a tube 7, the tube 7 being located in the cylinder 1, and attached thereto by an insulating body 8 which insulates the tube 7 from the remainder of the components of the damper. The hollow piston rod 3 and the tube 7 form together a variable circular clindrical capacitor. The damping medium present in the interior cavity 4 forms a dielectric for the capacitor. The hollow piston rod 3 forms the first electrode and is connected through a lead 9 connected through an insulating terminal (not shown) to appropriate terminals of an appropriate measurement device. The tube rod 7 forms a second electrode which is connected through a lead 10 to appropriate terminals of the measurement device.

Figure 2:
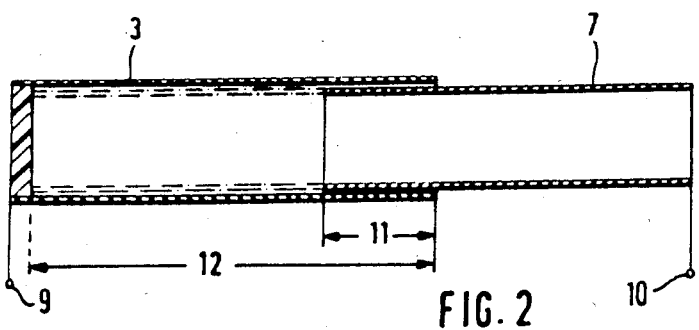
FIG. 2 shows a sectional view of a diagrammatic representation of a cylindrical capacitor.
Figure 8:
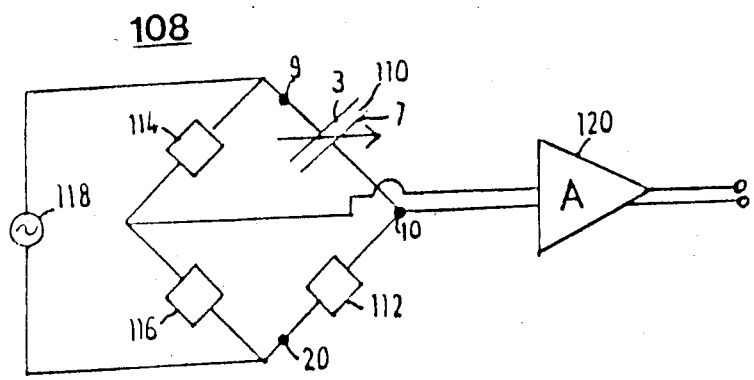
FIG. 8 shows schematically the embodiments of FIG. 1 and FIG. 7 arranged in an impedance measuring bridge.

The steepness of the change in capacitance is dependent upon the spacing between the outer surface of the tube 7 and the inner surface of the hollow piston rod 3, and on the medium present between them. The hollow piston rod 3 is arranged coaxially with and is concentrically spaced from the tube 7; a space between them receives the dielectric which may be a damping medium such as oil, or even a dielectric solid between the facing surfaces of the tube 7 and the piston rod 3. In FIG. 2, there is diagrammatically illustrated a cylindrical capacitor, the first electrode thereof comprising the hollow piston rod 3 and the second electrode comprising tube 7. The spacing 11 indicates a practical minimum overlap. The spacing 12 indicates the maximum overlap between the two surfaces when the piston 2 is as far to the right in FIG. 1 as it can move. These overlaps produce a minimum and maximum capacitance when appropriately converted, and represent the minimum and maximum travel positions of the piston. By interpolating between these extremes, the position of the piston in the cylinder is indicated by a capacitance thereinbetween. The leads 9 and 10 serve, for example, for connection to a capacitance measuring bridge as shown in FIG. 8 infra.

Figure 3:
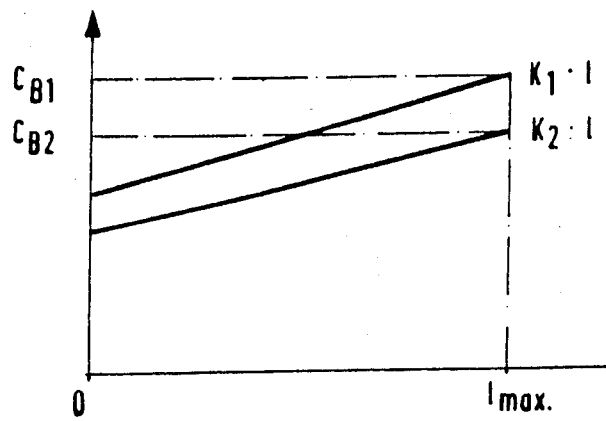
FIG. 3 shows a diagram of capacitance of the cylindrical capacitor of FIG. 2 with respect to piston position or piston travel.

FIG. 3 shows a diagram in which the capacitance of such a cylindrical capacitor is plotted against piston position or travel. It is seen from FIG. 3 that the change in capacitance is proportional to the travel of the piston, and the steepness of the curve is dependent on the ratio of the inside radius of the bore in the piston rod to the outside radius of the tube 7 as well as the relative dielectric constant $E_r$. The relative dielectric constant $E_r$ is predetermined in any known embodiment by the characteristics of the damping medium used. The two solid straight lines show two different cylindrical capacitor arrangements having, for example, different maximum overlap-spacings between the piston rod 3 and the tube, or relative dielectric constants $E_r$ of the dielectric.

Figure 4:
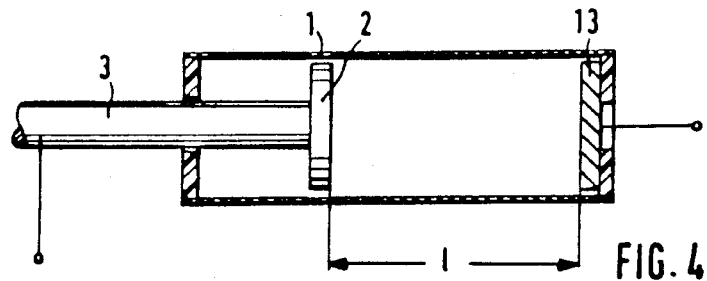
FIG. 4 shows a sectional view of a further embodiment of a vibration damper, in which the face of the piston and the base of the cylinder form plates of a capacitor.

FIG. 4 shows diagrammatically an alternative, second capacitive embodiment of the invention illustrating a vibration damper again having a cylinder 1, a piston 2 and a piston rod 3. The piston 2 and the base 13 of the cylinder respectively form the first and second electrodes of a capacitor. The base 13 of the cylinder 1 is mounted in this cylinder 1 but insulated therefrom so that a desired change in capacitance can be obtained by varying the distance between the piston 2 and the base 13 of the cylinder 1. By appropriate conversion of the measured value, likewise in this embodiment, the position of the piston can be obtained.

Figure 5:
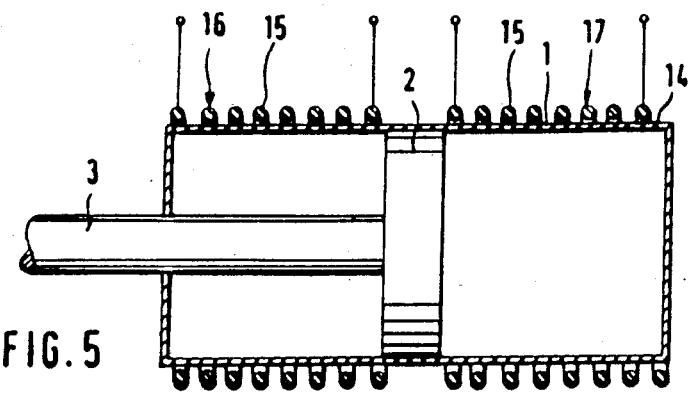
FIG. 5 shows a sectional view of a cylindrical vibration damper wherein an inductive coil is disposed on the surface of the cylinder.

As an alternative inductive embodiment, there is shown in section in FIG. 5, a vibration damper wherein again the principal components are the cylinder 1, the piston 2 and the piston rod 3.

The outer surface 14 of the vibration damper cylinder 1 is provided with windings 15, comprising a first coil 16 and a second coil 17, for respective generation of a magnetic field. The coils 16 and 17 when connected appropriately as the arms of a half-bridge generate a positional signal indicative of the position of the piston 2.

The resultant inductive half-bridge generates a bridge voltage determined by the degree or position of the insertion of the piston 2 in the damper cylinder, so that, a suitable signal corresponding to the piston travel is produced.

Figure 6:
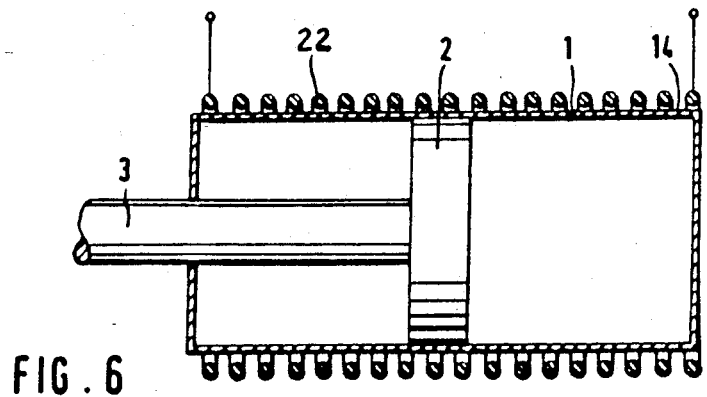
FIG. 6 shows a sectional view of a vibration damper with another coil arrangement.

FIG. 6 shows a modified inductive embodiment. The principal components of a vibration damper are here again the cylinder 1, the piston 2 and the piston rod 3 which in the embodiments using inductance; this piston rod 3 does not have to be made hollow. A winding is disposed on the outer surface of the vibration damper cylinder 1 extending preferably over at least the entire range of travel of the piston. On insertion of the piston within this region, there is a resulting change in inductance which can be correspondingly evaluated. The piston rod 3, at least, in FIG. 5 and FIG. 6, is preferably made of a ferromagnetic material in order to vary the inductance as much as possible from one relative position of the piston 2 and piston rod 3 to another position thereof.

Figure 7:
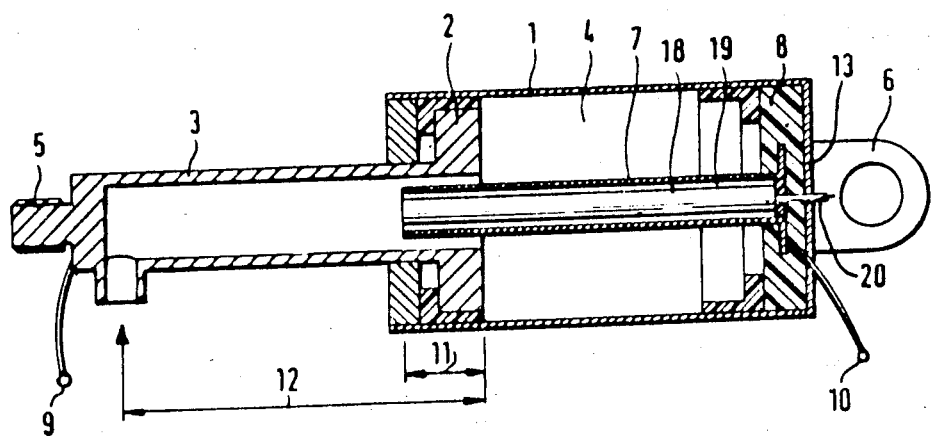
FIG. 7 shows a sectional view of a vibration damper in which the tube forms, with a further cylindrical tube, a second fixed capacitor.

The vibration damper illustrated in FIG. 7 comprises a fourth capacitance embodiment of the invention which is made up of basically the cylinder 1, the piston 2 and the piston rod 3 as in FIG. 1. Within the interior cavity 4 of the cylinder 1, there is the damping medium serving for damping vibrations. As in the embodiment of FIG. 1, mounting means 5 and 6 are provided for mounting the damper in the vehicle in a manner well-known in the prior art. The piston rod 3, which is made hollow, can slide telescopically over the tube 7, the tube 7 being secured in the cylinder in an insulating body 8 and being insulated with respect to the remainder of the components of the damper. The hollow piston rod 3 and the tube 1 form together the cylindrical capacitor. The damping medium present in the interior cavity 4 preferably forms the dielectric for the capacitor as in FIG. 1. The hollow piston rod 3 forms the first electrode and the tube 7 forms the second fixed electrode and is connected through the lead 10, passing through an insulated terminal arrangement (not shown), to the input of an appropriate measurement device such as shown in FIG. 8 infra.

The steepness of the change in capacitance is dependent upon the spacing between the outer surface of the tube 7 and the inner surface of the hollow piston rod 3 and on the dielectric medium present between them. The hollow piston rod 3 is arranged to be coaxial with and spaced from the tube 7; the space between them receives a suitable dielectric.

The spacing 11 represents the minimum overlap and the spacing 12 the maximum overlap between the two surfaces, producing accordingly a minimum and a maximum capacitance, which, appropriately converted, indicate the momentary piston travel, i.e., the position of the piston in the cylinder.

Secured within the cylindrical interior 19 of the tube 7 is a further tube 18 which is likewise arranged spaced from the tube 7. Between the two tubes, the damping fluid here again acts preferably as a dielectric as in FIG. 1; the dielectric may be solid. By the fixed arrangement of the two tubes 7 and 18 with respect to one another, there is produced a capacitor having a fixed capacitance at a particular temperature and pressure. The cylindrical tube 18 which acts as the further electrode is mounted in the insulating body 8 of the cylinder again in an insulating manner and is connected to the measurement receiver through a lead 20. The tube 7 and the tube 18 again form a tubular circular capacitor which serves for compensation of the measurement signal deviation causing by the pressure and temperature influence between the tube 7 and the piston rod 3. The manner of operation of the overall system is well-known in the prior art of Wheatstone Bridge as a capacitive half-bridge.

In FIG. 8, a schematic diagram is shown representing a bridge circuit 108, e.g., an impedance Wheatstone Bridge, for sensing the changes in capacitance of a variable capacitor 110 formed by the tube 7 and the hollow piston rod 3. The leads 9 and 10 are connected in the bridge 108 so that the capacitor 110 forms half on one arm of the bridge 108. Either a fixed capacitor external to the vibration damper or a temperature variable capacitor, as shown in FIG. 7, and formed by the tube 7 and the tube 18, comprises a capacitor 112 forming one-half of the bridge 108 connected to the capacitor 110. Two other impedance elements, 114 and 116 form the other half of the bridge 108. Series capacitors 110 and 112 form one arm and the series impedances 114 and 116 form the other arm of the bridge 108. A generator 118, preferably supplying alternating current, is connected across the bridge 108 at the connectors between the capacitors 110 and 114 and the impedances 112 and 116. The operation of a Wheatstone Bridge is well-known in the electrical prior art.

It is within the purview of the invention that this generator 118 may also be a generator of direct voltage if the impedance levels of the bridge 108 are appropriate therefor. Alternatively, within the purview of the invention, a pulse generator may also be used under special circumstances. The terminal 10 forms one input of an amplifier 120; a junction of the impedances 114 and 116 forms the other input of the amplifier 120 which generates a signal proportional to the position of the piston 2.

Figure 9:
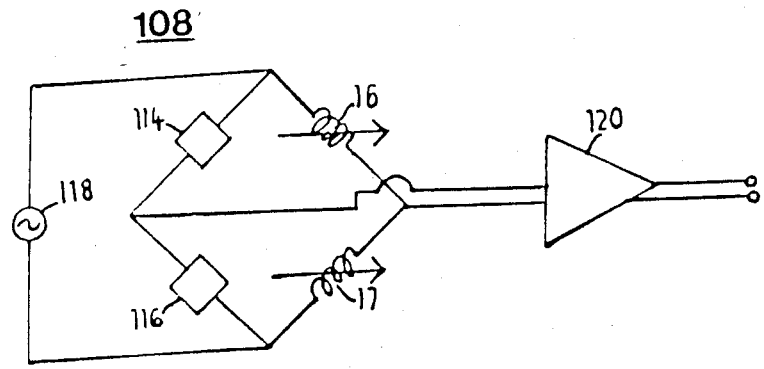
FIG. 9 shows schematically the inductive coil arrangement of FIG. 5 connected into an impedance measuring bridge.

In the case of the inductive coil embodiment of the invention as shown in FIG. 5 being adapted to the circuit in FIG. 8, the first coil 16 replaces the capacitor 110 and the second coil 17 replaces the capacitor 112 as in shown in FIG. 9. The other capacitors 114 and 116 are preferably replaced by impedances. However, other impedance elements may be used for capacitors 114 and 116 if their impedance is chosen appropriately in a manner which is well known in the impedance bridge art.

For example, if the capacitive impedances 110 and 112 in FIG. 8 both increase by the same percentage amount due to change in the mutual dielectric because of temperature, pressure, etc., the voltage at the terminal 10 will remain constant, as is well-known in the art of electrical bridge measurements such as the Wheatstone Bridge.

Figure 10:
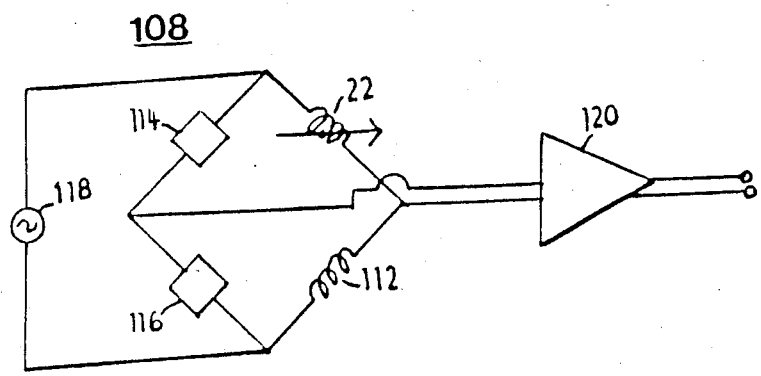
FIG. 10 shows schematically the coil arrangement of FIG. 6 connected into an impedance measuring bridge.

FIG. 10 shows the coil arrangement 22 of FIG. 6 connected into the bridge 108 replacing the capacitor 110.

Figure 11:
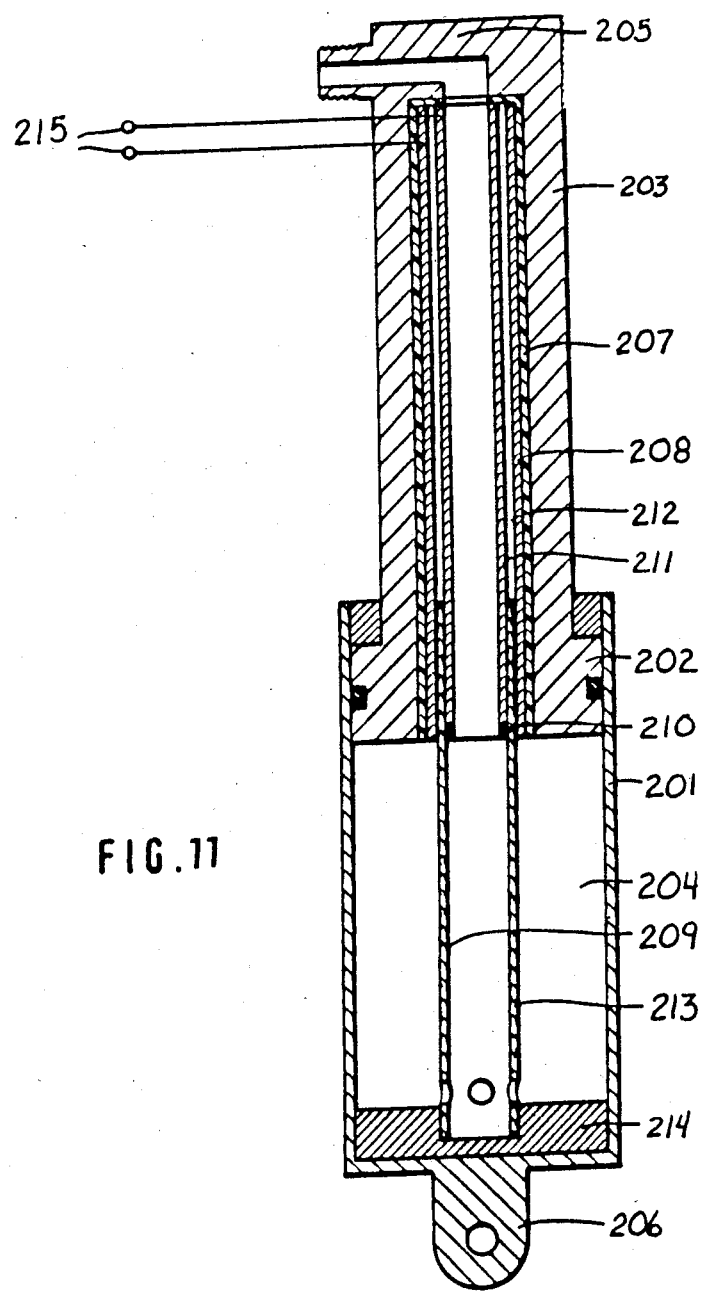
FIG. 11 shows a sectional view of another embodiment of which a tubular capacitor is arranged in the interior of the piston rod.

The vibration damper illustrated in FIG. 11 generally comprises the cylinder 201, the piston 202 and the piston rod 203. In the interior cavity 204 of the cylinder 201, there is provided a damping medium serving for damping the vibrations. Attachment means 205 and 206 are provided for mounting the vibration damper on the vehicle.

The piston rod 203 is made hollow, and therewithin are disposed a first electrode 208 and the second electrode 211. The first electrode 208 is insulated from the piston rod 203 by an insulating layer 207. Between the first electrode 208 and the second electrode 211 is a gap 212.

Since the first electrode 208 is substantially concentric to and spaced away from the second electrode 211, the tubular body 213, which is secured to the base 214 of the cylinder 201, can enter the gap 212 axially during operation of the damper in the vehicle. By the entry of the tubular body 213, a variation occurs in the capacitance between the first electrode 208 and the second electrode 211.

In the specific embodiment of FIG. 11, a ceramic tube is provided as the tubular body 213. The variation in capacitance arises because of different dielectric characteristics of the ceramic tube and the rest of the medium which may be oil.

The ceramic tube and the mineral oil which is present as the damping fluid each have a different dielectric constant, and on insertion of the ceramic tube 213 in the gap 212, the immersed surface of the ceramic tube acts as a different dielectric from oil.

In order to eliminate as far as possible the effect of the oil in the gap, between the electrode 211 and the ceramic tube 213, the ceramic tube 213 is provided with an electrically conducting surface on its inner cylindrical surface 209. This conducting surface is electrically connected to the second electrode 211 by an electrically conducting ring 210 provided on the outer surface of the second electrode 211. Since the inner cylindrical surface 209 electrically becomes a part of the second electrode 211, the oil in the gap between the second electrode 211 and the ceramic tube 213 does not have any electric filed generated therein. Therefore, this gap does not produce any capacitive effect and thereby variations in this gap due to tolerances, wear of the parts, etc., do not deleteriously affect the performance accuracy.

By virtue of the arrangement of the electrodes 208 and 211 either in the hollow piston rod 203 or in the cylinder 201, structurally preferred possibilities are provided for making the connections for the leads 215. The leads could be made to terminate as connecting terminals on the outer surface either of the cylinder 201 or the piston rod 203. The electrodes 208 and 211 are held fixed relative to one another. The tubular body 213 is fixed also; however, the tubular body is mounted in the cylinder 201 so that during operation of the vibration damper, a telescopic displacement of the components within each other takes place, and the tubular capacitor can perform as desired.

Figure 12:
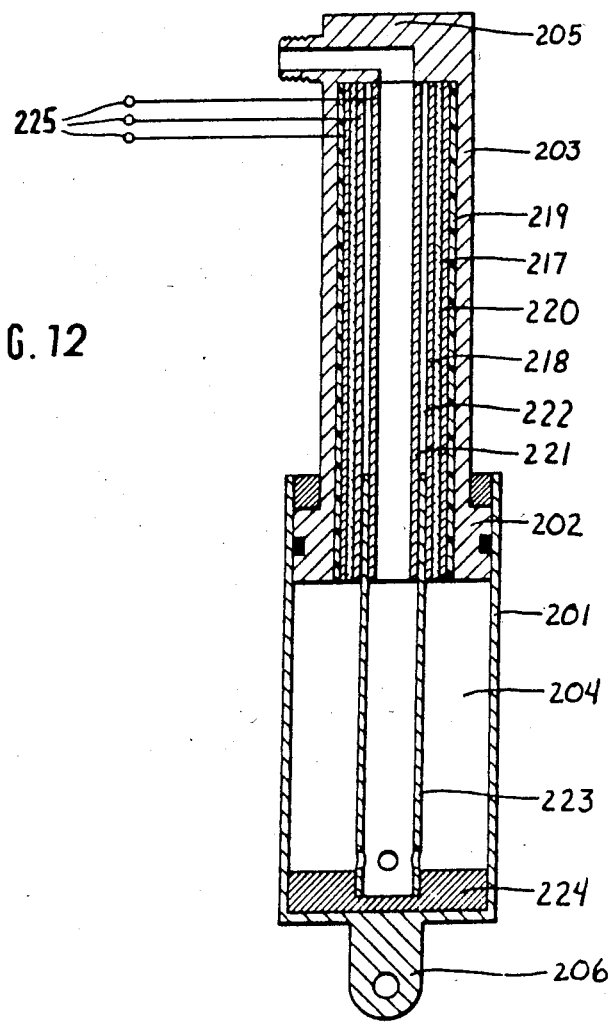
FIG. 12 shows a sectional view of a vibration damper in which a second fixed capacitor is mounted in the interior of the piston rod.

The vibration damper illustrated in FIG. 12 comprises substantially the cylinder 201, the piston 202 and the piston rod 203. In the interior cavity 204 of the cylinder 201, there is the damping medium serving for damping the oscillations. Securing devices 205 and 206 are provided as attachment means for mounting the damper in the vehicle.

Provided in the piston rod 203, which is made hollow, are the first electrode 217 and the second electrode 218. The first electrode 217 is insulated with respect to the piston rod 203 by a tube 219 of, for example, synthetic resin. A dielectric 220 is disposed between the first electrode 217 and the second electrode 218.

Spaced away from the second electrode 218 is a third electrode 221. The tubular body 223 is disposed to be able to enter the intermediate space 222 between the second electrode 218 and the third electrode 221 during active functioning of the damper in the vehicle. By the insertion of the tubular body 223 into the space 222, there occurs a change of capacitance between the second electrode 218 and the third electrode 221. The first electrode 217 forms, together with the second electrode 218, a fixed capacitance by contrast. The space 222 may be filled with a dielectric fluid, e.g., mineral oil.

Preferably, as illustrated, the tubular body is metallic; with the use of an electrically conducting tubular body 223, the latter must be earthed through the insulating body 224 of the cylinder. This results in the following manner of operation: with the piston rod 203 extended, the three electrodes form two fixed capacitances of known magnitude. On inward movement of the grounded electrically conducting tubular body 223, the capacitance between the second electrode 218 and the third electrode 221 is reduced because the effective capacitive surface area is diminished.

As an alternative in regard to the material of the tubular body 223, it is also possible for the tubular body 223 to be made in the form of an electrically non-conducting tube. For example, a tube of synthetic resin is suitable for this purpose. If a synthetic resin tube is provided to form the tubular body 223 then on entry of the synthetic resin tube between the second electrode 218 and the third electrode 221, there is produced a parallel circuit of two capacitors. The two capacitances of different values arise by the different dielectrics so that the overall capacitance of the second electrode 218 and the third electrode 221 results from the addition of the two individual capacitances. These different values of capacitance arise partly since the synthetic resin tube and the mineral oil which may be present as the damping fluid, each have different dielectric constants. If the tubular body 223 is made of synthetic resin, on insertion of the synthetic resin tube, the inserted surface area of the tubular body 223 acts as a dielectric.

The variable capacitance follows the formula:

$$C_{ges}(1) = C_a + C_b$$

where:
$C_{ges}$ = overall capacitance
$C_a$ = the individual capacitance of the first medium (e.g. Mineral oil)
$C_b$ = the individual capacitance of the second medium (e.g. Synthetic resin)

Figure 13:
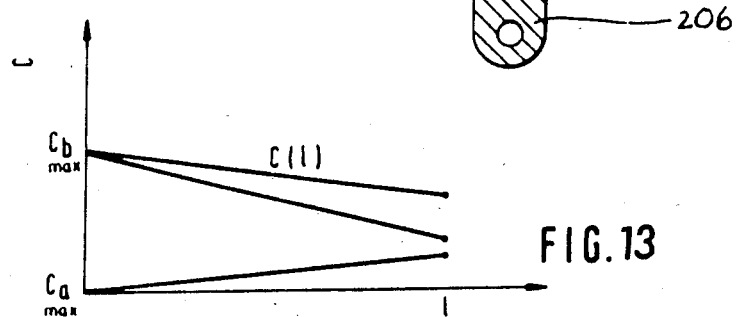
FIG. 13 depicts a piston travel/capacitance diagram for a cylindrical capacitor.

In FIG. 13, a diagram is shown in which the capacitance for such a cylindrical capacitor is drawn against piston travel or displacement. The individual capacitan $C_a$ falls steadily on insertion of the piston 202, whereas the individual capacitance $C_b$, in which the tubular body 223 is used as the dielectric, steadily increases. The two individual capacitances add up and form the resultant characteristic line $C_{ges}$.

By the disposition of the electrodes 217, 218 and 221, either within the hollow piston rod 203 or in the cylinder 201, there are advantageous possibilities for making connections to the leads 225 since these only need to be mounted as connecting pins on the outside surface of either the cylinder 201 or the piston rod 203. The electrodes are advantageously kept fixed relative to one another, and the tubular body 223 is likewise fixed, but in the other component. Accordingly during the action of a vibration damper, a telescopic displacement of the parts within one another takes place, so that the desired measured variable capacitance is formed.

The invention, as described hereinabove in the context of a preferred embodiment, is not be taken as limited to all of the provided details thereof, since modifications and variations thereof may be made without departing from the spirit and scope of the invention.

What is claimed is:

1. A damping cylinder in a vibration damper, said cylinder having an arrangement for measuring relative travel of a piston in said cylinder, comprising:
   a supporting member housing a first electrode which is mounted substantially fixed but substantially electrically insulated with respect to the supporting member;
   a second electrode spaced from the first electrode to define a space therebetween, said second electrode being substantially fixed with respect to the first electrode said first and second electrodes in use forming a capacitative reactance;
   a reactance varying member which is mounted to move in accordance with said relative travel between the piston and the cylinder, said reactance varying member being so disposed that its movement changes the capacitance between said first and second electrodes in accordance with said relative movement between the piston and the cylinder; and
   electrical connecting means connected to said fixed first and second electrodes for measuring the capacitance formed therebetween and for producing in use a signal indicative of relative movement between the piston and the cylinder.

2. The damping cylinder in said vibration damper, said cylinder having an arrangement according to claim 1 wherein said reactance varying member is made of a substantially electrically insulating material which on entering said space, acts as a dielectric medium.

3. The damping cylinder in said vibration damper, said cylinder having an arrangement according to claim 2 wherein said reactance varying member comprises a ceramic tube.

4. The damping cylinder in said vibration damper, said cylinder having an arrangement according to claim 2 wherein said reactance varying member comprises a tube made of epoxy resin.

5. The damping cylinder in said vibration damper, said cylinder having an arrangement according to claim 2, wherein said reactance varying member of insulating material includes an electrically conductive coating.

6. The damping cylinder in said vibration damper, said cylinder having an arrangement according to claim 1 wherein said first and second electrodes are tubular and substantially coaxial, and wherein said supporting member comprises a hollow piston rod which is substantially coaxial with said first and second electrodes.

7. The damping cylinder in said vibration damper, said cylinder having an arrangement according to claim 1 wherein said cylinder is filled with a dielectric fluid so as to fill said space, and wherein said reactance varying member at least partly displaces said dielectric fluid upon entering said space, whereby said capacitive reactance is a sum of a first capacitive reactance formed by the electrically insulating reactance varying member, and a second capacitive reactance formed by said dielectric fluid.

8. The damping cylinder in said vibration damper, said cylinder having an arrangement according to claim 1 wherein the reactance varying member comprises electrically conductive material and wherein the cylinder is filled with a dielectric fluid to fill said space, whereby, the reactance varying member upon entering said space partly displaces said dielectric fluid, thereby reducing the measured capacitance between the first and second electrodes.

9. A damping cylinder in a vibration damper, said cylinder having an arrangement for measuring relative travel of a piston in said cylinder, comprising:
   a supporting member in the form of a hollow piston rod and housing having fixed first and second spaced substantially coaxial tubular electrodes which are both substantially electrically insulated from the supporting member and mounted in a substantially fixed relationship with respect to each other to form a substantially annular gap;
   electrical leads connected to said first and second electrodes, said first and second electrodes in use forming a variable capacitance;
   a sleeve-like member which is mounted for movement reflecting said relative travel of the piston in said cylinder, said sleeve-like member being disposed to enter said substantially annular gap to vary in use said capacitance between said first and second electrodes; and
   said variable capacitance producing in use a signal indicative of relative travel of said piston in said cylinder.

10. The damping cylinder in said vibration damper, said cylinder having an arrangement according to claim 9 wherein said sleeve-like member comprises insulating material.

11. The damping cylinder in said vibration damper, said cylinder having an arrangement according to claim 10 wherein said sleeve-like member comprises a ceramic sleeve.

12. The damping cylinder in said vibration damper, said cylinder having an arrangement according to claim 10 wherein said cylinder is substantially filled with a fluid having dielectric properties so as substantially to fill said space, and wherein said reactance varying member at least partly displaces said dielectric fluid upon entering said space, whereby said capacitance becomes a combination of a first capacitance formed by the electrically insulating reactance varying member, and a second capacitance formed by said dielectric fluid.

13. The damping cylinder in said vibration damper, said cylinder having an arrangement according to claim 10, wherein said reactance varying member of insulating material has an electrically conductive coating.

14. The damping cylinder in said vibration damper, said cylinder having an arrangement according to claim 9 wherein said sleeve-like member comprises a sleeve made of epoxy resin.

15. The damping cylinder in said vibration damper, said cylinder having an arrangement according to claim 14 wherein said cylinder is substantially filled with a fluid having dielectric properties so as substantially to fill said space, and wherein said reactance varying member at least partly displaces said dielectric fluid upon entering said space, whereby said capacitance becomes a combination of a first capacitance formed by said first and second electrodes and said sleeve-like member, and a second capacitance formed by said dielectric fluid in association with said first and second electrodes.

16. An arrangement for measuring relative travel of a piston in a damping cylinder of a vibration damper for a mechanical suspension assembly for a vehicle, comprising:
   a hollow piston rod housing first and second, substantially coaxial tubular electrodes which are spaced from one another and which are both substantially electrically insulated from the piston rod and mounted in a substantially fixed relationship with respect to each other to form a substantially annular gap, said first and second electrodes forming a variable capacitance;
   a sleeve-like member which is mounted for movement reflecting said relative travel of the piston in said cylinder, said sleeve-like member being disposed to slidingly enter said substantially annular gap to vary said variable capacitance;
   a third electrode substantially electrically insulated from both the first and second electrodes and spaced from the second electrode to form a substantially fixed reference capacitance in use; and
   electrical connecting means connected to said fixed first, second and third electrodes.

17. The arrangement for measuring relative travel of a piston in a damping cylinder of a vibration damper for a mechanical suspension assembly for a vehicle according to claim 16 wherein said sleeve-like member comprises an epoxy resin sleeve.

18. The arrangement for measuring relative travel of a piston in a damping cylinder of a vibration damper for a mechanical suspension assembly for a vehicle according to claim 16 wherein said sleeve-like member comprises a ceramic cylinder.

19. The arrangement for measuring relative travel of a piston in a damping cylinder of a vibration damper for a mechanical suspension assembly for a vehicle according to claim 16 wherein said sleeve-like member comprises a metallic cylinder.

20. The arrangement for measureing relative travel of a piston in a damping cylinder of a vibration damper for a mechanical suspension assembly for a vehicle according to claim 16 wherein said mechanical suspension assembly comprises a liquid dielectric filled and sealed assembly, whereby said sleeve-like member by its movement displaces said liquid dielectric from said annular gap.

21. The arrangement for measuring relative travel of a piston in a damping cylinder of a vibration damper for a mechanical suspension assembly for a vehicle according to claim 16 wherein an electrical measuring bridge connected to at least said first, second and third electrodes to measure said variable capacitance to produce a signal, by using said fixed capacitance as a reference, said signal indicating the extent of movement of said piston in said cylinder.

* * * * *